United States Patent
Tubaro et al.

(10) Patent No.: US 7,626,584 B2
(45) Date of Patent: Dec. 1, 2009

(54) METHOD FOR DETERMINING THE THREE-DIMENSIONAL SURFACE OF AN OBJECT

(75) Inventors: Stefano Tubaro, Novara (IT); Augusto Sarti, Seregno (IT); Luca Piccarreta, Milan (IT); Marco Marcon, Bollate (IT)

(73) Assignee: Politecnico Di Milano, Milan (IT)

( * ) Notice: Subject to any disclaimer, the term of this patent is extended or adjusted under 35 U.S.C. 154(b) by 256 days.

(21) Appl. No.: 10/572,634

(22) PCT Filed: Sep. 13, 2004

(86) PCT No.: PCT/EP2004/052154
§ 371 (c)(1),
(2), (4) Date: Apr. 10, 2007

(87) PCT Pub. No.: WO2005/027053

PCT Pub. Date: Mar. 24, 2005

(65) Prior Publication Data

US 2007/0229493 A1    Oct. 4, 2007

(30) Foreign Application Priority Data

Sep. 18, 2003 (IT) .......................... MI2003A1779

(51) Int. Cl.
*G06T 15/00* (2006.01)
(52) U.S. Cl. .................. 345/419; 345/421; 345/581
(58) Field of Classification Search .................. 345/473; 702/18
See application file for complete search history.

(56) References Cited

U.S. PATENT DOCUMENTS 5,671,136 A * 9/1997 Willhoit, Jr. .................. 702/18
5,877,777 A * 3/1999 Colwell ....................... 345/473
6,718,054 B1  4/2004 Lorigo et al.

FOREIGN PATENT DOCUMENTS

WO       00/79481      12/2000

OTHER PUBLICATIONS

A. Davey, K. Stewartson, On Three-Dimensional Packets of Surface Waves, Proceedings of the Royal Society of London. Series A, Mathematical and Physical Sciences (1934-1990), vol. 338, No. 1613 / Jun. 4, 1974, pp. 101-110.*

(Continued)

*Primary Examiner*—Xiao M Wu
*Assistant Examiner*—Phi Hoang
(74) *Attorney, Agent, or Firm*—Wenderoth, Lind & Ponack, L.L.P.

(57) ABSTRACT

A method for determining the three-dimensional surface of an object comprises the phases of: defining (1) the coordinates of a plurality of points of said object; defining (2) a three-dimensional matrix of cells that contains said object to which a value can be associated; determining (3) the distance between each centre of said cells of said three-dimensional matrix of cells and the closest point of said plurality of points of said object; setting (4) the value of several cells of said three-dimensional matrix of cells at a first preset value; determining (7) the value that each cell of said three-dimensional matrix of cells assumes, with the exception of said several cells, by means of the following formula $$F(\bar{x}_i, t+1) = \frac{F(\bar{x}_i, t) \cdot v_i + w \cdot \sum_j F(\bar{x}_j, t) \cdot v_j}{v_i + w \cdot \sum_j v_j}$$

where $\bar{x}_i$ represents the coordinates of the centre of the i_th cell,
$F(\bar{x}_i, t)$ represents the value of the i_th cell at time t,
$v_i$ represents said distance,
w represents a second preset value, and
j indicates a neighborhood of cells of the i_th cell;
determining (9) the sum in module of the variations of the value of each cell between the time t and the time t+1; repeating (10) said phase of determining the value that each cell of said three-dimensional matrix of cells assumes if said sum is greater than a third preset value.

20 Claims, 1 Drawing Sheet

OTHER PUBLICATIONS

Hong-Kai Zhao et al., "Fast Surface Reconstruction Using the Level Set Method", IEEE Workshop on Variational and Level Set Methods, Jul. 13, 2001, pp. 194-201, XP002314204.

Ken Museth et al., "Level Set Segmentation From Multiple Non-Uniform Volume Datasets", VIS 2002, IEEE Visualization 2002, Proceedings, Boston, MA, Oct. 27-Nov. 1, 2002, Annula IEEE Conference on Visualization, New York, NY: IEEE, US, Oct. 17, 2002, pp. 179-186, XP010633291, ISBN: 0-7803-7498-3.

* cited by examiner

METHOD FOR DETERMINING THE THREE-DIMENSIONAL SURFACE OF AN OBJECT

BACKGROUND OF THE INVENTION

1. Field of the Invention

The present invention refers to a method for determining the three-dimensional surface of an object and a relevant computer program.

2. Description of Related Art

For describing and analysing the geometry of objects that have to be produced, modelling methods that use computers are known. In particular, when a three-dimensional surface enclosed by a set of points acquired from a real object has to be obtained, a technique called level-set that describes an enclosed surface as a level surface of a volumetric function (or implicit function) is normally used.

The level-set technique provides for the time evolution of the volumetric function, according to a suitable equation of the partial derivatives, typically belonging to the Hamilton—Jacobi family of equations.

The volumetric function describes the distance of each point from the enclosed surface and this distance will have positive or negative sign according to the point considered whether it is inside or outside the surface. Thus the set of points that possess a null distance from the surface S represent the surface itself. The technique provides for the evolution of the enclosed surface, defined by the Hamilton—Jacobi equation so that it surrounds and adheres to the cloud of 3D points that describes the object.

This technique is used as it is capable of adapting to the various types of objects and to the most diverse point acquisition techniques. This technique in fact, does not require any additional information about the topology of the points acquired and is insensitive to the technique used: the density of the points can vary in the different zones of the object considered; no information is required about the point acquisition sequence or about their relative spatial positions; and the number of objects enclosed separated from each other is not relevant for the algorithm.

As this technique requires the updating of a volumetric function at each step of evolution of the front, the calculation cost is usually very high, so much so that it makes the method of very little practical utility. Methods are known that permit the reduction of the calculation cost of this technique, for example limiting the updating of the volumetric function in an enclosed zone surrounding the front in evolution. Despite this the calculation cost remains prohibitive.

Alternative techniques to the level-set technique are also known. For example, methods such as those of the Delaunay triangulation are known, as well as the NURBS (Non Uniform Rational B-Splines) and the HRBF (Hierarchical Radial Basis Function). Each of these methods has limitations and imposes a series of restrictions on the set of the points acquired, such as for example the calculation complexity depends heavily on the number of points, or they need to have a spatial distribution of the points acquired as uniform as possible.

BRIEF SUMMARY OF THE INVENTION

In view of the state of the technique described, an object of the present invention is to provide for a rapid method for determining the three-dimensional surface of an object that does not have the inconveniences of the known art.

In a first aspect, the present invention relates to a method for determining the three-dimensional surface of an object comprising the phases of: defining the coordinates of a plurality of points of said object; defining a three-dimensional matrix of cells that contains said object to which a value can be associated; determining the distance between each centre of said cells of said three-dimensional matrix of cells and the closest point of said plurality of points of said object; setting the value of several cells of said three-dimensional matrix of cells at a first preset value; determining the value that each cell of said three-dimensional matrix of cells assumes, with the exception of said several cells, by means of the following formula $$F(\bar{x}_i, t+1) = \frac{F(\bar{x}_i, t) \cdot v_i + w \cdot \sum_j F(\bar{x}_j, t) \cdot v_j}{v_i + w \cdot \sum_j v_j}$$

where $\bar{x}_i$ represents the coordinates of the centre of the i_th cell,
$F(\bar{x}_i, t)$ represents the value of the i_th cell at time t,
$v_i$ represents said distance,
w represents a second preset value, and
j indicates a neighbourhood of cells of the i_th cell;
determining the module sum of the variations of the value of each cell between the time t and the time t+1; and
repeating said phase of determining the value that each cell of said three-dimensional matrix of cells assumes if said sum is higher than a third preset value.

In its second aspect, the present invention relates to a computer program comprising a program code that carries out all the phases of the method for determining the three-dimensional surface of an object when said program is carried out on said computer.

In its third aspect, the present invention relates to a computer program stored in a memory that can be used by a computer to control the execution of all the phases of the method for determining the three-dimensional surface of an object.

In the present invention, by replacing the differential equation of the partial derivatives normally used in literature (Hamilton-Jacobi) with one that is very well suited to describing discontinuous functions such as those that describe the interface between two immiscible fluids, that is one of the Navier-Stokes equations, derived from the fluid dynamics, the calculation cost is considerably reduced, and a much quicker convergence can be obtained. The surface can be interpreted as the front between two viscous fluids that moves until it completely encloses the object. In particular, acting on the viscosity value of the fluids used it is also possible to control the level of roughness permitting smooth surfaces to be obtained even if the points presented deviations from their correct spatial position. In addition, the method proposed permits the introduction of elements and strategies that enable an end control of the evolution of the front, based on simple principles which are interpretable physically. For example, an artificial turbulence can be introduced in the fluids that facilitates penetration inside particularly narrow cavities. Thus it is possible to provide a correct determination even of configurations of points that traditionally had been negated. Thanks to its flexibility, the Navier-Stokes equation can be used for determining more volumetric functions that describe different parts of the object considered. Objects that are particularly complex or that have high resolutions can thus be represented by calculating separately the evolution of the volumetric function on the different parts that make them up. The individual results obtained are then recomposed to obtain the overall volumetric function using a simple mathematic operator.

BRIEF DESCRIPTION OF THE DRAWINGS

The characteristics and advantages of the present invention will appear evident from the following detailed description of an embodiment thereof, illustrated as non-limiting example in the enclosed drawing, in which.

DETAILED DESCRIPTION OF THE INVENTION

Figure 1:
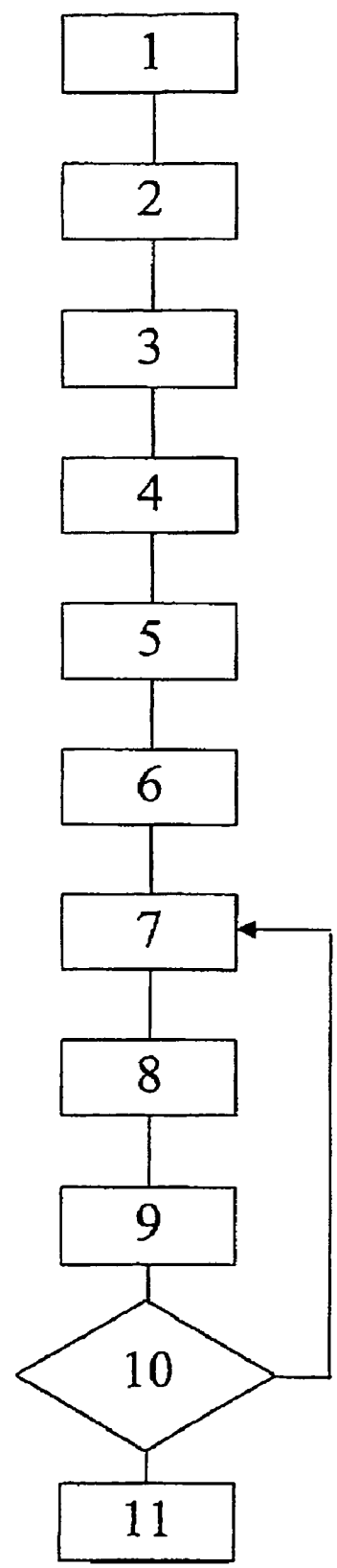
FIG. 1 shows a flow diagram of the method for determining the three-dimensional surface of an object.

The present invention is based on the Navier—Stokes differential equation for the conservation of mass in which a redefinition of the velocity vector is used according to a criterion described hereunder. It describes the motion of two immiscible fluids that converge, one from inside and the other from outside, towards the cloud of points that describes the object considered. At the end of the evolution, when both the fluids adhere to the points of the object, the surface of separation between the two coincides with the surface of the object itself.

The volumetric function describes the contents of the two fluids in each elementary cell or voxel, where voxel means the elementary element of the volumetric grid, such as how the pixel is used for a two-dimensional grid. To distinguish the two fluids we have assigned opposite sign mass to them. Therefore a cell in which the volumetric function is worth $-1$ contains exclusively the internal fluid, while a value of $+1$ indicates that only external fluid is present.

If between two adjacent cells the volumetric function changes sign it implies that the surface of separation passes between them and thus also the surface of the object. The exact point of passage is determined by means of interpolation operations.

The exact position of the contact surface between the two fluids is thus identified by the position of the level-set zero (that is the set of points with null distance from the surface).

The law for the conservation of mass is one of the fundamental principles of classical physics and it is independent from the nature of the fluids and from the forces that act on it; it expresses the principle according to which in a fluid dynamic system mass cannot disappear or be created unless sinks or sources are present.

The value F of the volumetric function in each cell indicates the quantity of fluid inside it and this value is modified by the forces acting on the fluid, by its velocity, by the diffusion coming from the adjacent cells and from the sources or sinks.

The evolution of a fluid inside a system can be described by means the flow vector G that expresses the quantity of fluid that crosses a surface in a given interval of time.

In its classic formulation the law of conservation for mass affirms that the time variation of the quantity of matter F inside a volume $\Omega$, $$\frac{\partial}{\partial t}\int_\Omega F d\Omega$$

is equal to the net contribution of the flow that crosses the external surface S of $\Omega$, to the contribution $Q_V$ of sources (or sinks) inside the volume, and to the contribution of sources $\overline{Q}_S$ oriented along its surface S. The contributions due to the different sources can thus be written as:

$$\int_\Omega Q_v d\Omega + \int_S \overline{Q}_s \cdot d\overline{S}$$

The general formulation for the conservation of mass equation can thus $$\frac{\partial}{\partial t}\int_\Omega F d\Omega = -\int_S \overline{G}\cdot d\overline{S} + \int_\Omega Q_v d\Omega + \int_S \overline{Q}_s d\overline{S}$$

be written as:

The negative sign in front of the flow integral is due to the fact that the area $d\overline{S}$ is orientated outwards from Q.

Using the Gauss theorem the previous equation can be rewritten using exclusively volume terms:

$$\frac{\partial F}{\partial t} + \overline{\nabla}\cdot\overline{G} = Q_v + \overline{\nabla}\cdot\overline{Q}_S$$

The flow density vector $\overline{G}$ can be decomposed in a diffusive component $\overline{G}_D$ and in a convective component $\overline{G}_C$, the convective part of the flow vector describes the transport phenomenon due to the external forces and is defined as the product between the velocity $\overline{v}$ of the flow and the quantity of matter transported F: therefore it results $\overline{G}_C = \overline{v} F$.

The diffusive component instead derives from the remixing, present also in resting fluids, due to thermal agitation, and is usually proportional, according to the law of Fick, to the gradient of F $G_D = \gamma \nabla F$ where $\gamma$ is the diffusivity constant. The time evolution of the volumetric function F due to the diffusivity is regulated (as can be verified forcing the conservation of mass) by the differential heat equation and thus its results are mainly connected to regularizing and a flattening of the function F. The effect of the diffusive contribution is thus taken into consideration applying a Gaussian filtering to the entire volumetric function.

The intensity and the orientation of the velocity v of the fluid is determined in each cell of the matrix. This velocity has been defined orientating the flow towards the point of the 3D cloud (that describes the object) closest to the cell, and the modulus of this vector has been selected directly proportional to the distance: in this manner both the fluids progressively slow down coming closer to the cloud of points and converge at the final surface of contact. The equation that has thus been used to describe the evolution of the two fluids is the following:

$$\frac{\partial F(\overline{x}_i,t)}{\partial t} = \frac{\int_\Omega F(\overline{x},t)|\overline{v}(\overline{x})|\cdot e^{-\frac{|\overline{x}-\overline{x}_i|^2}{2\sigma^2}} dx}{\int_\Omega |\overline{v}(\overline{x})|\cdot e^{-\frac{|\overline{x}-\overline{x}_i|^2}{2\sigma^2}} dx}$$

The local variation of the quantity of fluid contained in the i_th cell $F(\bar{x}_i,t)$ between two successive instants therefore results determined by the convective contribution deriving from each cell $F(\bar{x}_i,t)$ $|\bar{v}(\bar{x})|$ weighed with a Gaussian function whose standard deviation σ describes the degree of diffusion of the fluid between the different cells.

The velocity $\bar{v}(\bar{x})$ has been defined for each cell according to the distance between the centre of the cell and the closest point belonging to the 3D cloud. In particular the modulus of this velocity equals $|\bar{x}_i-\bar{p}|^\alpha$ where $\bar{x}_i$ is the centre of the i_th cell, while $\bar{p}$ is the closest point of the cloud of points (the point at least distance from the centre of the i_th cell), α is instead a parameter that regulates the course of the velocity function. Experimentally it has been determined that acceptable values for α are between 1.5 and 2.5. The greater this value is, the slower the velocity will be in proximity to the points while it will be rapid at a great distance. Even though this characteristic is very important for a rapid evolution of the values of the matrix it can however lead to a slow final convergence. A preferred value of the value of α equals 2.0.

Another property of the fluids used in the model is the viscosity, whose value determines the standard deviation σ inside the equation. This property describes the viscous friction that acts inside the fluid limiting its mobility. Considering this property we prevent the fluids from crossing the reconstructed surface and flowing between the interstices of the various points. This property is particularly important as through it special arrangement of points can be correctly met such as fine blades or particularly pointy objects. Thanks to the viscosity, the fluids do not cross the surface which remains adherent to the blade or to the point. It is also possible to reduce the curving of the entire surface obtaining particularly smooth surfaces and reducing the surface roughness that can also have originated from the error in measurement. It must be remembered however that high values can limit the capacity of the algorithm to represent objects with particularly jagged surfaces and to enable the flow of the liquid inside concave zones. Because of the above-mentioned, the viscosity is a parameter whose choice is determined according to the typology of the object considered, by the imprecision of the acquisition system used, and by the degree of definition required for the adhesion of the final surface to the cloud of points.

Another aspect that has been used in the physical modelling of the fluids is turbulence, which treats the presence of whirlpools that describe local variations of the velocity function.

The presence of turbulence can locally develop high pressures and can generate instability in the flow but at the same time can favour the penetration of the fluid inside very small openings and prevent stagnation in zones with modest velocities.

The presence of vortexes is introduced by modulating the field of velocity with small oscillations in the different directions around the initial configuration. Because of the close correlation between the velocity vector in each cell and the vector that points towards the closest point of the 3D cloud, the local oscillations of the velocity field can also be interpreted as an elastic deformation of the cloud of points in the various directions which can facilitate the entrance of the fluid inside the restricted zones.

The modulation of the velocity function is applied cyclically along the three spatial axes by multiplying by a factor the terms v of the velocities of the cells that lie orientated in parallel to these axes in relation to the i_th cell under examination and its intensity can be controlled externally, in particular at each iteration the velocity is amplified in a given direction and/or the velocity in the other two directions is reduced by an equal quantity.

Obviously the greater the expansion coefficients used the greater will be the turbulence. Values that are too high can however determine an excessive remixing between the two fluids on the contact surface causing the leakage of the internal fluid or an excessive penetration of the external fluid in the object considered.

The previous equation that was used to describe the evolution of the two fluids has been discretized to be able to carry out the operations more easily by means of a computer and is described by the following equation.

$$F(\bar{x}_i, t+1) - F(\bar{x}_i, t) = \frac{F(\bar{x}_i, t) \cdot v_i + w \cdot \sum_j F(\bar{x}_j, t) \cdot v_j}{v_i + w \cdot \sum_j v_j} - F(\bar{x}_i, t)$$

where
$\bar{x}_i$ represents the spatial coordinates (three-dimensional array) of the
i_th cell,
$F(\bar{x}_i,t)$ represents the value of the i_th cell at time t,
$v_i$ represents the velocity (or the distance as previously defined),
w represents a preset value of viscosity, and
j is a preset value that indicates a neighbourhood of cells of the i_th cell.

In particular, the index summation j considers the contribution of the closest cells to the point under examination. Preferably, this interaction was chosen to be limited exclusively to the first 6 cells near each cell under examination, that is that share with it an entire face of the cubical cell (the cells at distance 1 from the cell under examination).

We now refer to FIG. 1 that shows the flow diagram of the method for determining the three-dimensional surface of an object. This flow diagram describes how a computer program carries out the calculation for determining the three-dimensional surface of an object.

Phase 1—Data Definition.

In this phase the coordinates of a plurality of points of the object that is needed to be represented are defined. The set of the points is described as a set of vectors with 3 components, containing the spatial coordinates of each point. No additional information is requested in relation to the points.

Phase 2—Definition of Cell Matrix.

In this phase the cell matrix (or three-dimensional grid) that defines the evolution domain of the value of F is described. The number of cells is chosen on the basis of the dimensions of the object that is needed to be represented. The number of cells that will be used is determined on the basis of the extensions along the three axes of the object. Thus keeping a cubical form for each elementary cell of the matrix, a grid that contains the object is defined. It is also possible to define a form of the cells that is not cubical, that is a different resolution of the matrix along the different axes can be set. This can be very important for objects in which a high resolution is necessary only in a dimension such as low relief, building faces, etc.

It is also possible to define a rotated matrix in relation to the axes according to which the object has been acquired and, in particular, align it with the main directions of the object itself. Thus it is possible to minimize the number of cells used at the same time keeping the same resolution. A centre with the appropriate coordinates belongs to each cell, and a value can be associated to each cell.

Phase 3—Determining the Velocity.

In this phase the field of the velocities that belong to each cell of the grid is defined. As we saw previously the velocity field depends closely on the distance of each centre of the cells from the closest point of the cloud of points. Thus, the field of the distances is a three-dimensional matrix with the same dimensions as the grid. For each cell the point of the 3D cloud that is the closest (at least distance) is determined and the distance is calculated as $|\bar{x}_i - \bar{p}|^\alpha$ between this point and the centre of the cell. This value is stored in memory in an equivalent cell of the matrix of the distances.

Take note that it is not necessary to know the direction of the velocities but only the modulus.

It is important to note that, the dependence of the calculational complexity of this method on the number of points of the 3D cloud is limited exclusively to the determination of the velocity field, only once at the beginning of the procedure, and all the evolutive phase it is completely independent from the number of sample points used.

Phase 4—Arrangement of the Sources.

Different arrangements of the sources are possible. A first arrangement provides for the external sources to be placed exclusively on the edges of the matrix (a first portion of the cells, which will thus always be kept at the value +1 during the entire evolution) and all the remaining cells instead to be filled with external fluid (value equal to −1). A second arrangement instead provides also for one or more internal sources to be provided, in this case the cells of the edge will always be kept at +1, the value of the internal cells will be equal to 0, while the internal sources will always be kept at −1. This method permits an even more rapid evolution but requires initial information relative to the arrangement of the additional internal sources that is not easily available.

Phase 5—Fixing Viscosity and Turbulence Parameters.

The viscosity (in the discretized formula represented by w) regulates the diffusion of the fluid and thus the weight of the interaction between each single cell and its neighbours. The preferred value of w is between 0.1 and 0.9.

The parameters relating to the turbulence indicate how the velocities of the fluid, in each cell, are altered at each iteration with the purpose of simulating the turbulent effect. In particular it is possible to set for each of the 3 axes the coefficient by which the velocity in this direction will be multiplied cyclically. The multiplicative factors for the velocity vary preferably by a minimum of 0.5 up to a maximum of 1.5. The use of the turbulent regime is optional.

Phase 6—Starting Up the Procedure.

To accelerate the operations, and optionally, provision is made in this field for another three-dimensional matrix with the dimensions of the matrix of the cells in which the information regarding the updating or not of the different cells is contained. If a cell can be updated its contents will be processed by the evolutive algorithm and thus the contents of liquid inside it can vary between two iterations. Cells that cannot be updated are the sources (that are always kept at the same value, +1 or −1). During the evolution also those cells for which the variation of liquid between two iterations has not been relevant (below a certain set threshold) can become non-updateable and thus these cells are frozen until the evolutive front approaches them.

Phase 7—Updating Cells.

It is the main phase of the method in which the value of the quantity of fluid present in each cell of the three-dimensional matrix of cells is determined.

The use of the Gaussian function inside the integral would provide for the analysis at each iteration of the interaction of each cell with all the matrix of the cells, which would result in being particularly cumbersome in computational terms.

In the case with the discretized formula, it is possible and preferable to limit the extension of this interaction exclusively to a neighbourhood of cells closer to the i_th cell, that can be for example 6 or 18 or 26 (the cell considered is at the centre of a matrix 3×3×3), that is those that are respectively in face, edge or vertex contact (that is at distance 1, $\sqrt{2}$ and $\sqrt{3}$ from the cell under examination, in the case of cubic cells) from the i_th cell. Preferably the 6 closest cells have been chosen, that is the 6 cells that contact the 6 faces of the i_th cell.

Once the cell has been updated, the variation in relation to the previous value is assessed and if this value is lower than a threshold set by the user the contents of the cell are frozen and the cell is declared not updateable.

Phase 8—Visualization

It is possible, if it interests, to visualize the level-set zero, that is the surface of separation between the two fluids. The algorithm used is that commonly known with the name of Marching Cubes (see for example the article "Marching cubes: a high resolution 3D surface construction algorithm", by William E. Lorensen and Harvey E. Cline, from Computer Graphics, Volume 21, Number 4, July 1987) by means of which it is possible to obtain an effective triangulation of the level-set zero and a sub-pixel resolution thanks to the linear interpolation carried out on adjacent cells. The triangulation thus obtained is represented on video, for example, by means of an interface program called OpenGL that permits visualization in real time and a direct interaction with the user who can interactively change at will the view point analysing the evolution of the level-set in real time.

Phase 9—Determining the flow variations.

At the end of each evolution the overall quantity of fluid that has been moved is assessed.

Phase 10—Evolution cycle.

If the overall quantity of fluid that has been moved is slower than a preset threshold the evolution is interrupted at phase 11, otherwise it carries out further iteration.

At phase 11, when the calculation is completed, a three-dimensional matrix of points is obtained that defines the values that each point assumes the volumetric function.

It is possible to apply a low-pass filter to this matrix so as to obtain a smoother reconstructed surface removing possible errors of sampling without acting on the viscosity parameters (that could prejudice the correct determination of concave zones). The implementation of this filter is the same as that to carry out a one- and two-dimensional filtering: the entire volumetric function is conveyed with a three-dimensional matrix containing values of the filter. For example it can be made in low-pass filter using a matrix 3×3×3 in which the central element has the maximum value and the other elements possess a value given by the value of a Gaussian function depending on their distance from the centre of the matrix.

With the present method, in which case it is possible and convenient to decompose a surface of large dimensions in distinct parts, it is possible to calculate the evolution singularly on each part and recompose then the various volumetric functions. In this manner it is also possible to use different resolutions for the different parts, then recomposing them on a single common matrix. It is preferable, in order to improve the link between the different parts, between the different defined zones, that there is overlapping, that is that part of the end points belonging to a zone are also incorporated in the adjacent zone. Once the matrices of the various zones are obtained, they are arranged on a common matrix with resolution equal to the maximum resolution used. In the case the contents of a cell of the final grid are contemporarily described by two volumetric functions (because they overlap) the minimum between all the volumetric functions that describe it is chosen as value for this cell.

The method for determining the three-dimensional surface of an object, herein described, can be transcribed in a program code, in a manner well known to a technician of the sector, that can be stored on any type of memory or support (floppy, CD) and/or can be carried out by a computer.

The invention claimed is:

1. A method for determining a three-dimensional surface of an object using a computer, the method comprising:

defining coordinates of a plurality of points on the surface of the object;

defining a three-dimensional matrix of cells that contains the object, each cell of the three-dimensional matrix of cells having a center, and a value being able to be associated with each cell of the three-dimensional matrix of cells;

determining a distance between the center of each cell of the three-dimensional matrix of cells and a closest point of the plurality of points on the surface of the object;

setting the value associated with each of a first portion of cells of the three-dimensional matrix of cells to a first preset value;

determining the value associated with each cell of the three-dimensional matrix of cells using the computer, with the exception of the first portion of cells, by means of the following formula $$F(\overline{x}_i, t+1) = \frac{F(\overline{x}_i, t) \cdot v_i + w \cdot \sum_j F(\overline{x}_j, t) \cdot v_j}{v_i + w \cdot \sum_j v_j}$$

where $\overline{x}_i$ represents coordinates of the center of the i_th cell, $F(\overline{x}_i, t)$ represents the value of the i_th cell at time t, $v_i$ represents the distance, w represents a second preset value, and j indicates a neighbourhood of cells of the i_th cell;

determining a sum in modulus of a variation of the value associated with each cell between the time t and the time t+1; and repeating said determining the value associated with each cell of the three-dimensional matrix of cells if the sum in modulus is greater than a third preset value.

2. The method according to claim 1,
wherein each cell of the three-dimensional matrix of cells has a cubic shape.

3. The method according to claim 1,
wherein each cell of the three-dimensional matrix of cells has a parallelepiped shape.

4. The method according to claim 1,
wherein said determining the distance is by means of the following formula $$|\overline{x}_i - \overline{p}|^\alpha$$

where $\overline{x}_i$ represents the coordinates of the center of the i_th cell, $\overline{p}$ represents coordinates of a point of the plurality of points on the surface of the object having a shortest distance from the center of the i_th cell, and $\alpha$ represents a fourth preset value.

5. The method according to claim 4,
wherein the fourth preset value $\alpha$ is between 1.5 and 2.5.

6. The method according to claim 5,
wherein the fourth preset value $\alpha$ is 2.

7. The method according to claim 1,
wherein said setting the value of the first portion of cells of the three-dimensional matrix of cells to a first preset value comprises setting to a value +1 all the values associated with cells at edges of the three-dimensional matrix of cells, and wherein the value associated with each of a remainder of cells of the three-dimensional matrix of cells is set to a value −1.

8. The method according to claim 1,
wherein the second preset value is between 0.1 and 0.9.

9. The method according to claim 1,
wherein the index j represents a neighbourhood of cells contacting at least one of a face, a corner, and a vertex of the i_th cell.

10. The method according to claim 1, further comprising filtering the value associated with each cell of the three-dimensional matrix of cells by multiplying the value associated with each cell of the three-dimensional matrix of cells by a fifth preset value.

11. The method according to claim 1, further comprising multiplying the distance determined in said determining the distance cyclically along three spatial axes by a multiplicative coefficient.

12. The method according to claim 1,
wherein said defining the coordinates of the plurality of points on the surface of the object further comprises subdividing the object into at least two distinct parts, each cell of the three-dimensional matrix of cells belonging to at least one distinct part of the at least two distinct parts, wherein said determining the value associated with each cell of the three-dimensional matrix of cells comprises determining a value for each cell of the three-dimensional matrix of cells for each of the at least two distinct parts, and wherein the value associated with a cell of the three-dimensional matrix of cells belonging to two distinct parts of the at least two distinct parts is a lower value of respective values determined for the cell for the two distinct parts.

13. A computer-readable storage medium storing a computer program for causing a computer to execute the method according to claim 1.

14. A computer-readable storage medium storing a computer program for causing a computer to execute the method according to claim 2.

15. A computer-readable storage medium storing a computer program for causing a computer to execute the method according to claim 3.

16. A computer-readable storage medium storing a computer program for causing a computer to execute the method according to claim 4.

17. A computer-readable storage medium storing a computer program for causing a computer to execute the method according to claim 5.

18. A computer-readable storage medium storing a computer program for causing a computer to execute the method according to claim 7.

19. A computer-readable storage medium storing a computer program for causing a computer to execute the method according to claim 8.

20. A computer-readable storage medium storing a computer program for causing a computer to execute the method according to claim 9.

* * * * *